United States Patent [19]

Eventoff et al.

[11] Patent Number: 4,739,299
[45] Date of Patent: Apr. 19, 1988

[54] DIGITIZER PAD

[75] Inventors: Franklin N. Eventoff, Los Angeles; Tyrone Christiansen, Hollywood, both of Calif.

[73] Assignee: Interlink Electronics, Inc., Santa Barbara, Calif.

[21] Appl. No.: 820,757

[22] Filed: Jan. 17, 1986

[51] Int. Cl.[4] .................. H01C 10/10; H01C 10/12
[52] U.S. Cl. ........................... 338/99; 338/114; 340/365 A
[58] Field of Search ............ 338/99, 69, 100, 114; 84/DIG. 7; 178/18, 19, 28; 340/365 A, 711, 712, 825.89; 29/25.35

[56] References Cited

U.S. PATENT DOCUMENTS

| | | | |
|---|---|---|---|
| 4,315,238 | 2/1982 | Eventoff | 338/99 |
| 4,319,078 | 3/1982 | Yokoo et al. | 178/18 |
| 4,441,097 | 4/1984 | Anderson | 340/365 A |
| 4,484,026 | 11/1984 | Thornburg | 178/18 X |

Primary Examiner—E. A. Goldberg
Assistant Examiner—M. Lateef
Attorney, Agent, or Firm—Nilsson, Robbins, Dalgarn Berliner, Carson & Wurst

[57] ABSTRACT

A digitizer pad includes at least two sets of terminals where each set has at least a first and second terminal positioned to define a parameter dimension therebetween. A resistor ply is disposed between the terminals of each set. The resistor ply has an electrical contact surface with a resistance gradient profile between the terminals in each set. An output terminal is electrically interconnected to a selected location along the contact surface of the resistor ply. A voltage source is sequentially coupled, by suitable switching means, across a selected subset of terminals in each set of terminals whereby the voltage at the output terminal is a measure of the selected location along the parameter dimension defined by the terminals across which the voltage source is coupled.

24 Claims, 5 Drawing Sheets

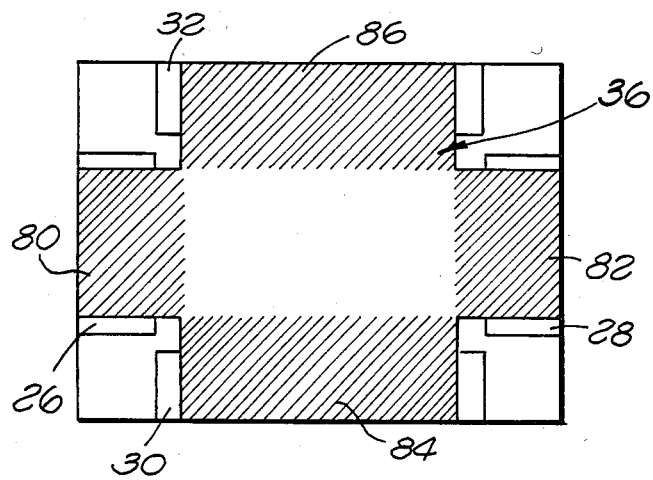
FIG. 5
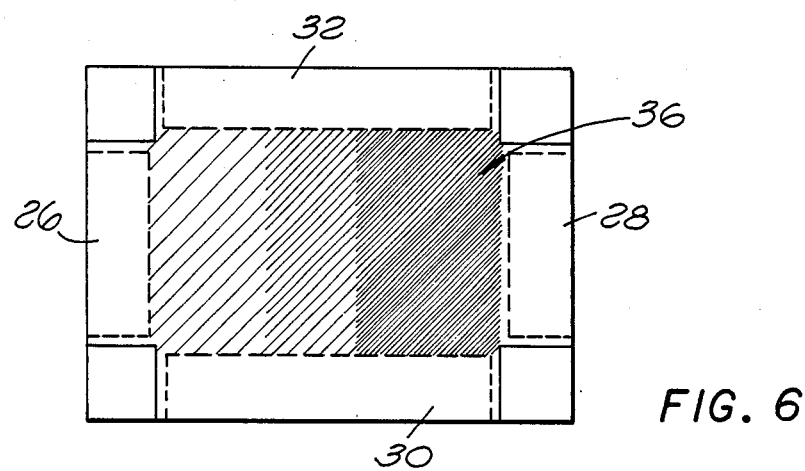
FIG. 6
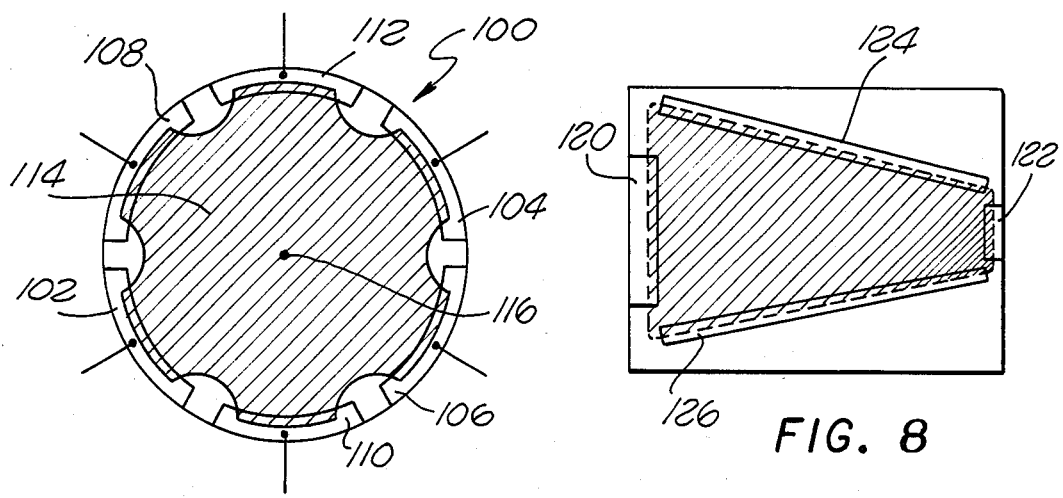
FIG. 7
FIG. 8

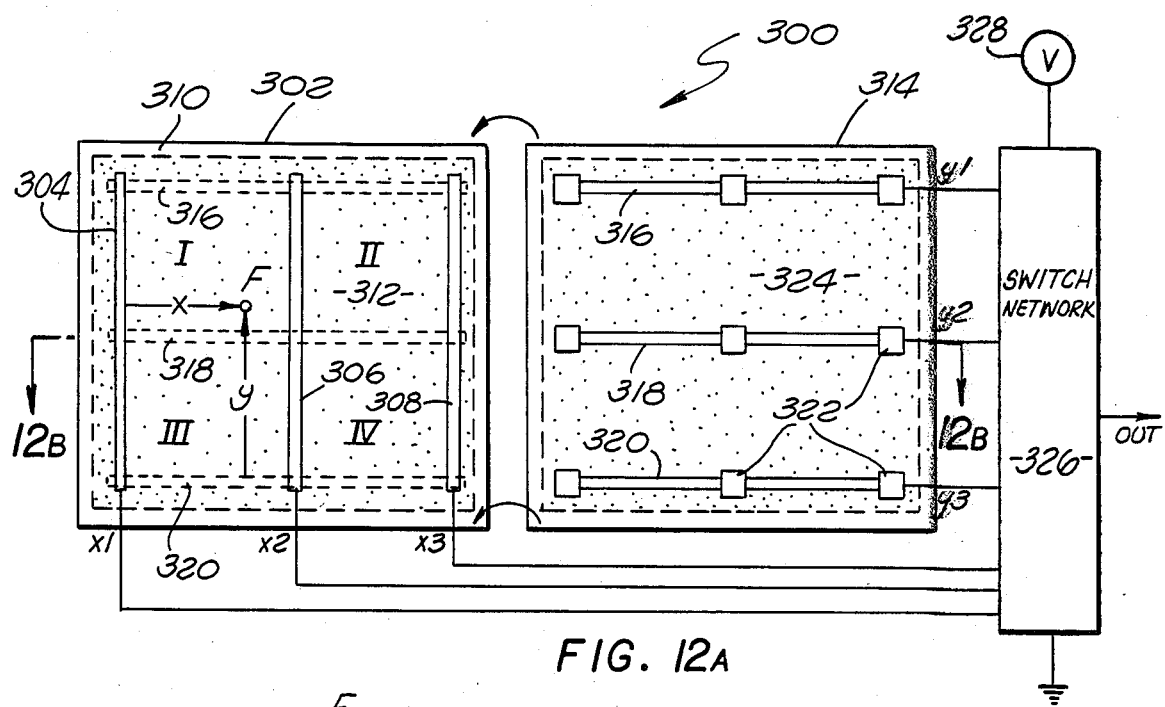
FIG. 12A
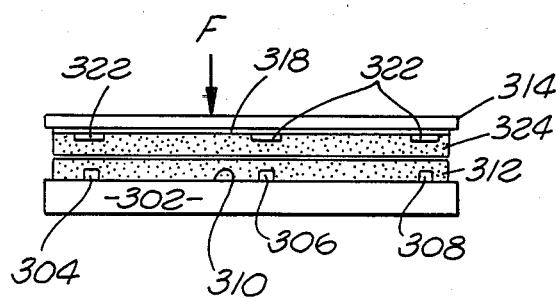
FIG. 12B
FIG. 13
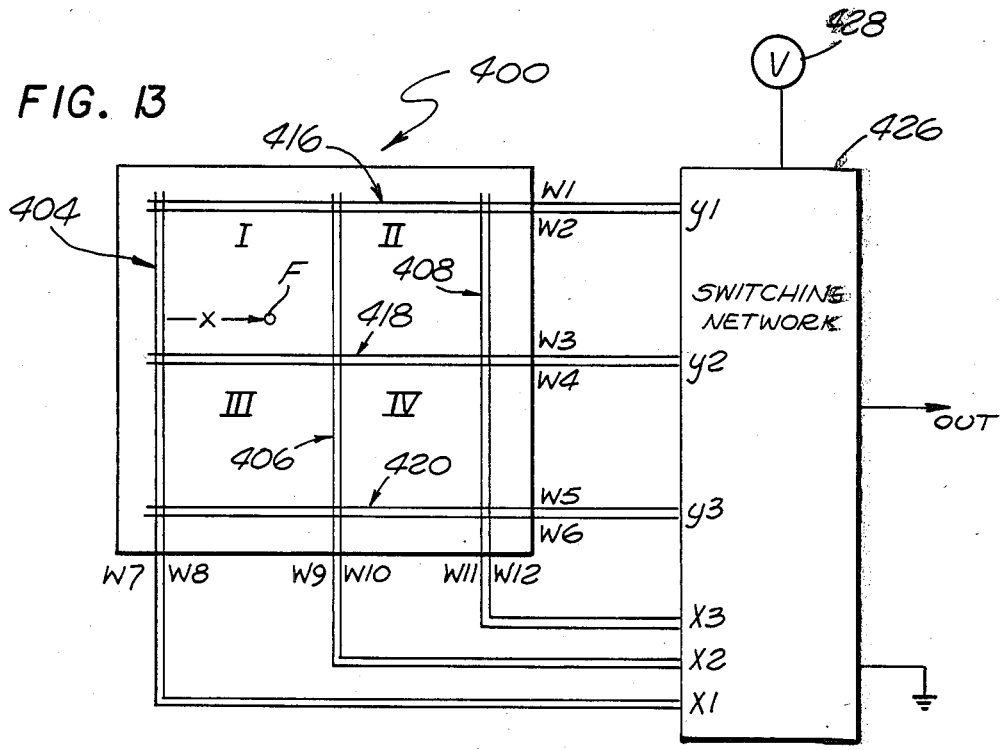

4,739,299

DIGITIZER PAD

BACKGROUND OF THE INVENTION

The present invention relates to an electronic position sensing device and in particular to digitizer pads, also referred to as bit pads and graphics input tablets, capable of three parameter sensing.

Various types of transducer devices are known whereby various parameters may be measured. Such sensor devices are essential to provide data inputs to electronic circuits and other devices to allow the electronic or electromechanical device to perform its intended function. The present invention is a sensor device, referred to as a digitizer pad, which presents a surface area against which a point contact can be made. The sensor is configured to locate the point of contact in relationship to a predefined linear or non-linear potential field. Such spatial location sensing may be provided in any suitable coordinate system such as an orthogonal coordinate system or a polar coordinate system. Further, in the preferred embodiment of the invention, a third parameter, namely pressure, can be sensed to provide a digitizer pad capable of sensing two spatial parameters and one pressure parameter to provide a three parameter sensing digitizer pad.

Such three parameter digitizer pads can be used in signature analysis by generating samples at a plurality of points as the signature is made where each sample includes two dimensional spatial information and pressure information to indicate the varying pressure used by the person signing his signature. Such digitizer pads could also provide parameter inputs for computer games, keyboards, graphics display inputs and the like.

Heretofore, digitizer pads have, at most, included spacial location sensing in only two dimensions without the ability to sense pressure. Furthermore, prior digitizer pads have been highly complex and very expensive thereby limiting their usefulness in most applications. By contrast, the present invention provides a digitizer pad which is very accurate, and yet is inexpensive and easy to construct. Additionally, the present invention includes a pressure sensitive semiconducting ply as described in connection with U.S. Pat. No. 4,315,238 issued Feb. 9, 1982, which patent is hereby incorporated by reference. This semiconducting ply enables measurement of a pressure parameter in addition to the two dimensional spacial parameters of the point of contact on the digitizer pad.

SUMMARY OF THE INVENTION

A digitizer pad apparatus includes at least two sets of terminals where each set includes at least a first terminal and a second terminal. Also included is a resistor ply disposed to electrically interconnect the terminals in each set. The resistor has an electrical contact surface and is characterized by a resistance gradient along the spatial dimension between selected pairs of terminals in each set. The digitizer pad further includes a third (output) terminal and means for electrically interconnecting the third terminal to a selected location along the electrical contact surface of the resistor ply. At least one voltage source is coupled to be selectively interconnected between at least two of the terminals. A switching means intermittently selects one of the sets of terminals and connects the voltage source across one pair of the terminals of the selected set to provide a voltage drop between the two terminals. Simultaneously, the switching means is interconnected to provide a substantially zero voltage drop between the other terminals whereby the voltage at the third terminal is a measure of the spacial location of the selected location along the parameter dimension defined by the terminal across which the voltage source is coupled.

A pressure sensitive layer is, in the preferred embodiment, disposed between the resistor ply and the third terminal. The switching means is further interconnected to the voltage source for selectively providing a voltage differential across the pressure sensitive layer while simultaneously interconnecting the terminals so that the voltage drop across the terminals will be substantially zero. The voltage across the first pressure sensitive layer will therefore vary inversely with the magnitude of applied force.

BRIEF DESCRIPTION OF THE DRAWINGS

A complete understanding of the present invention and of the above and other advantages and features thereof may be gained from a consideration of the following description of the preferred embodiments taken in conjunction with the accompanying drawings in which:

FIG. 5 is a top view of a digitizer pad in accordance with one embodiment of the invention where the resistor ply has a greater resistive gradient adjacent the terminals and a smaller resistive gradient across the center region.

FIG. 6 is a top view of one embodiment of a digitizer pad in accordance with the invention having a variable resistive gradient across its surface in one of its spacial dimensions.

FIG. 7 is a top view of another embodiment of the digitizer pad in accordance with the invention comprising multiple pairs of terminals in a circular configuration.

FIG. 8 is another embodiment of the digitizer pad in accordance with the invention having opposing nonparallel terminals for altering the potential profile across the surface of the digitizer pad.

FIGS. 12A and 12B illustrate an embodiment of the digitizer pad having three terminals in each set whereby the sensing area is divided into quadrants.

FIG. 13 illustrates an embodiment somewhat similar to the embodiment of FIG. 12 wherein the terminals are lead pairs to facilitate electrical isolation of the quadrants.

DETAILED DESCRIPTION

Figure 1:
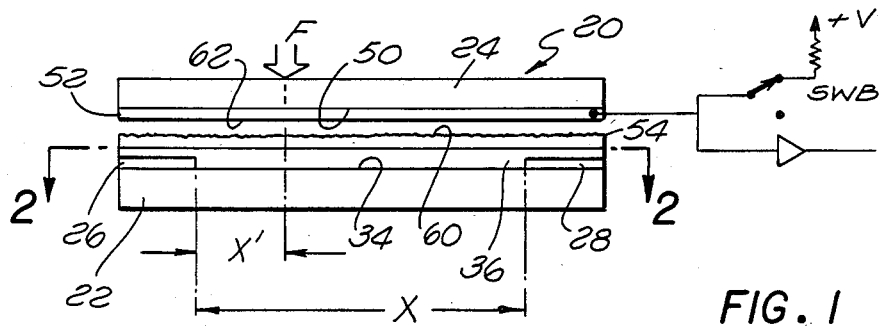
FIG. 1 is a cross sectional view of a digitizer pad having four terminals on a base ply in accordance with the invention.
Figure 2:
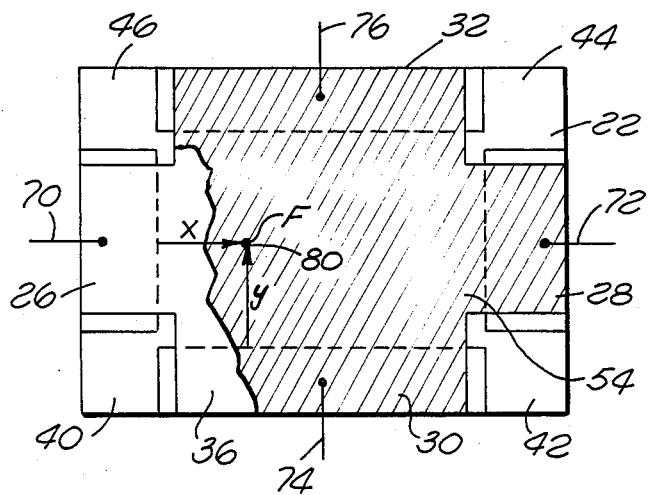
FIG. 2 is a top view of the digitizer pad illustrated in FIG. 1 through section 2—2.

Referring initially to FIGS. 1 and 2, a digitizer pad 20 in accordance with the invention comprises a base ply 22 and a top ply 24. Disposed at selected spaced locations on the top surface 34 of the base ply 22 are conductive terminals 26, 28, 30 and 32. The terminals 26 and 28 are paired together and positioned on opposite sides of the base ply 22 in parallel relationship to one another. Similarly, the terminals 30 and 32 are likewise paired together and oriented parallel to one another on opposite edges of the base ply 22.

A reistor ply 36 is disposed on the top surface 34 of the base ply 22 so that the resistor ply 36 is in electrical contact with the terminals 26, 28, 30 and 32 and extends across the region of the top surface 34 interior to and bounded by the terminals 26, 28, 30 and 32. In the preferred embodiment, the resistor ply 36 does not extend to cover corner regions 40, 42, 44 and 46 so that the conduction paths through the resistor ply 36 between the edges of adjacent terminals will be made longer thereby increasing the resistance along each such conduction path. Such increased resistance results in increased isolation between adjacent terminals.

The digitizer pad 20 includes the top ply 24 which has a surface 50 on which is disposed a conductive ply 52. In the preferred embodiment of the digitizer pad, a pressure sensitive, semiconductive ply 54 is incorporated between the conductive ply 52 and the resistor ply 36.

In accordance with the invention, the conductive ply 52 is in normally nonconducting relationship to the resistor ply 36. This may be accomplished in any of a number of ways. For example, the conductive ply 52 may be physically spaced from the resistor ply 36 as illustrated in FIG. 1 so that the top ply 24 will have to be displaced downwardly to force the conductive ply 52 into electrically conductive relationship with the resistor ply 36.

In one embodiment such as that shown in FIG. 1, the pressure sensitive ply 54 is disposed in intimate electrically conducting relationship on top of the resistor ply 36. In another embodiment, such as that shown in FIG. 3, an additional pressure sensitive ply 56 is disposed to cover and be in intimate electrically conducting relationship with the conductive ply 52. Hence in the embodiment shown in FIG. 3, there are two pressure sensitive plies 54 and 56 in facing and touching but non-electrically conducting relationship to one another.

Figure 3:
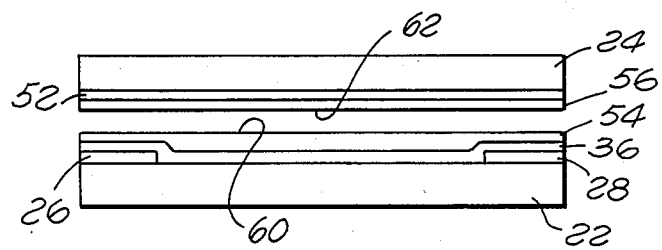
FIG. 3 is a cross sectional view of a digitizer pad incorporating two facing pressure sensitive semiconducting layers in accordance with the invention.
Figure 4:
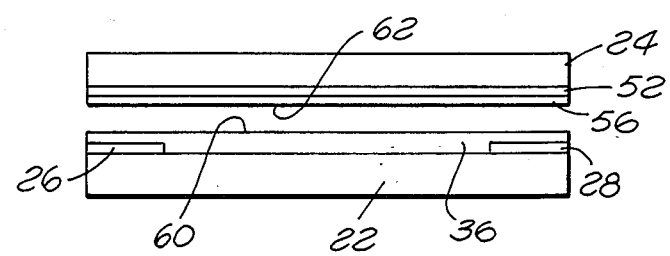
FIG. 4 is a cross sectional view of a digitizer pad wherein the pressure sensitive semiconducting layer is disposed to cover the conductor on the top ply.

In yet another embodiment of the invention, illustrated in FIG. 4, the pressure sensitive conductive ply 54 of FIG. 3 is eliminated and the pressure sensitive ply 56 is applied to cover the surface of the conductive ply 52. When a pressure sensitive ply such as the plies 54 or 56 or both 54 and 56 are disposed between the conductor ply 52 and the resistor ply 36, facing contact surfaces 60 and 62 (also shown in FIGS. 1 and 3) of the base ply 22 and the top ply 24 respectively may be in touching relationship. A light touching of the contact surfaces 60 and 62 in such an embodiment will result in virtually no conduction through the pressure sensitive ply resulting in a normally opened, that is, a normally non-conducting, relationship between the conductive ply 52 and the terminals 26, 28, 30 and 32. As a force F is applied to the top ply 24, the junction resistance across the junction between the surfaces 60 and 62 will decreases, thereby allowing conduction to occur between the conductive ply 52 and one of the terminals 26, 30, 28 or 32. A complete description and explanation of the pressure sensitive ply is described in U.S. Pat. No. 4,315,238.

The conductive ply 52, as well as the terminals 26, 28, 30 and 32, may be made of silver, copper, aluminum, or any other suitable conductive material. The resistor ply may be formed from a composition including, for example, carbon particles or from carbon ruthinum or any other suitable material which exhibits a resistance gradient along a length of the resistor material.

Referring to FIG. 5, electrical isolation between adjacent terminals may be enhanced by providing a resistor ply with a varying resistive gradient across the resistor ply. Thus, the resistor ply 36 may be configured to have greater resistance in the regions 80, 82, 84, 86 adjacent the terminals 26, 28, 30 and 32, respectively, with the central region 88 of the resistor ply having a lesser resistive gradient. Such a variable resistive gradient may be provided in any of a number of different ways such as by varying the concentration of conductive particles in the various regions. Hence, in the regions 80, 82, 84 and 86, the concentration of conductive particles would be less to increase the resistive gradient whereas the concentration of conductive particles in the region 88 would be increased to lower the resistive gradient.

It should also be appreciated that the resistor ply 36 may have a varying or a non-linear resistive gradient across its length and width. For example, FIG. 6 shows a resistor ply 36 which has a resistive gradient which increases from right to left. This may be accomplished by providing a resistive ply with an increasing concentration of conductive particles in a direction from left to right. In such an embodiment, the resistive gradient between terminals 26 and 28 will be non-linear. However, the resistive gradient between terminals 30 and 32 will be substantially constant.

It can therefore be seen from a consideration of FIGS. 1-6 that the resistor ply 36 allows for the creation of an electrical potential profile across the surface of the resistor ply which can be varied in accordance with user requirements.

In addition to a resistive ply possibly with a varying resistive gradient across its surface, the present invention may be configured with more than two pairs of terminals. Referring to FIG. 7, a circular digitizer pad apparatus 100 in accordance with the invention has three pairs of terminals, for example, terminal pair 102 and 104, terminal pair 106 and 108, and terminal pair 110 and 112. A resistor ply 114 is provided in the central region bounded by the terminals where resistor ply 114 is configured to increase electrical isolation between adjacent terminals.

In an alternative configuration of the digitizer pad apparatus 100 of FIG. 7, a central, preferably grounded, terminal 116 may be provided. In this alternative configuration, the digitizer pad apparatus 100 will comprise six terminal pairs where each terminal pair includes the terminal 116 and one of the terminals 102, 104, 106, 108, 110 or 112.

Referring to FIG. 8, another embodiment includes a first pair of terminals comprising a terminal 120 and an opposite, spaced apart, parallel terminal 122 and a second pair of terminals comprising a first terminal 124 and a second terminal 126. The terminals 124 and 126 are in a non-parallel orientation relative to each other. The voltage drop across the resistor ply between the two terminals 124 and 126 will therefore occur across a progressively shorter physical distance. This, or course, will affect the potential profile across the width and length of a resistor ply 128 between the terminals.

Figure 9:
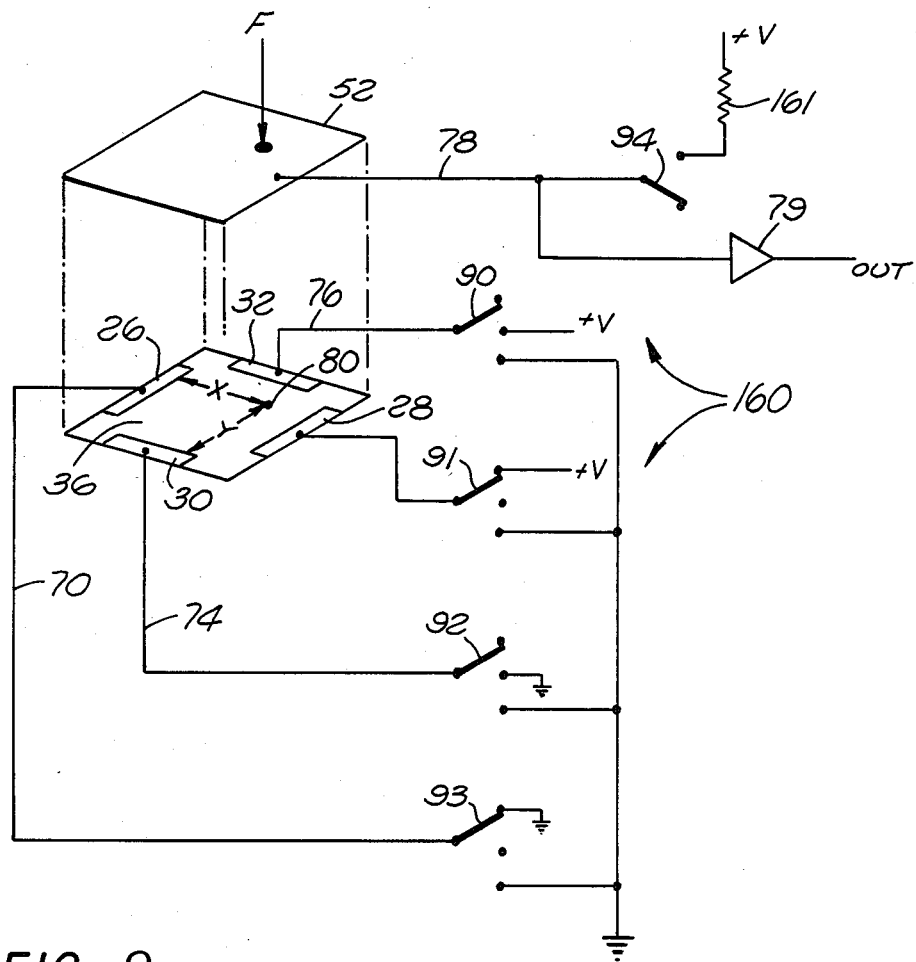
FIG. 9 is a digitizer pad, such as that illustrated in FIG. 1, interconnected to appropriate switching circuitry to illustrate the operation and means of sequentially sensing the spatial characteristic of the point of contact in the x and y dimensions and the pressure dimension at the point of contact.

Referring to FIG. 9, the digitizer pad identifies both the spatial location and the magnitude of force applied at a point on the surface of the digitizer pad. In order to determine the spatial coordinates as well as the amount of pressure applied, for example, at the point 80, a switching apparatus 160 is provided whereby each terminal 26, 28, 30 and 32 is coupled via a suitable lead 70, 72, 74 and 76, respectively (see FIG. 1 also), to selectively couple the terminals to an open switch contact, a grounded switch contact or a switch contact to which a voltage from a voltage source is applied. The operation of the switch may be sequential under either manual or computer control to determine the X-coordinate, Y-coordinate and then pressure (z coordinate) of the point of contact 80 between the conductive ply 52 and the resistor ply 36.

More specifically, to measure the X-coordinate, that is, the distance from terminal 26 to the point of contact 80, terminal 30 and 32 are connected to the opened contact of switches 92 and 90, respectively. Simultaneously, the lead 72 is connected via switch 91 to the voltage source +V and the terminal 26 is connected via lead 70 and switch 93 to ground. A lead 78, connected to the conductive ply 52, is coupled to an amplifier 79 so that the voltage at the output of the amplifier 79 will be the same as the voltage drop along the resistor ply 36 from the contact point 80 to the terminal 26. As the point of contact 80 moves closer to the terminal 26, the voltage will decrease and the output voltage from the amplifier 79 will decrease. Hence, a direct relationship between the voltage and the "X" coordinate location exists and the "X" coordinate can therefore be determined from the value of the output voltage from amplifier 79.

Once the X-coordinate voltage has been determined, the Y-coordinate voltage may be determined by interconnecting the terminal 32 to the voltage source +V via switch 90, interconnecting the terminal 30 to ground via switch 92, and coupling the terminals 26 and 28 to the opened contacts of switches 91 and 93, respectively. The voltage drop between the point of contact 80 and the terminal 32 will be a measure of the distance Y from the terminal 30 to the contact point 80 as described in conjunction with the measurement of the coordinate X.

Finally, the pressure can be determined if a pressure sensitive ply 54 is disposed between the conductor ply 52 and the resistor ply 36 by coupling the terminals 26, 28, 30 and 32 to ground via switches 90, 91, 92 and 93 while simultaneously using switch 94 to connect the conductor ply 52 to a voltage source through resistor 161. Thus, there will be a potential across the junction between the pressure sensitive ply 54 and the resistor ply 36. As the pressure is increased, the junction resistance will decrease and the potential drop across the junction resistance will decrease, thus resulting in an increased output voltage from amplifier 79 proportional to the applied pressure.

By sequentially sampling the X-coordinate, Y-coordinate and pressure coordinate as above described; digitizing the output from the amplifier 79; and storing the resultant digitized values, it is possible to provide data necessary to perform such functions as signature analysis or any other desired computer input.

Figure 10:
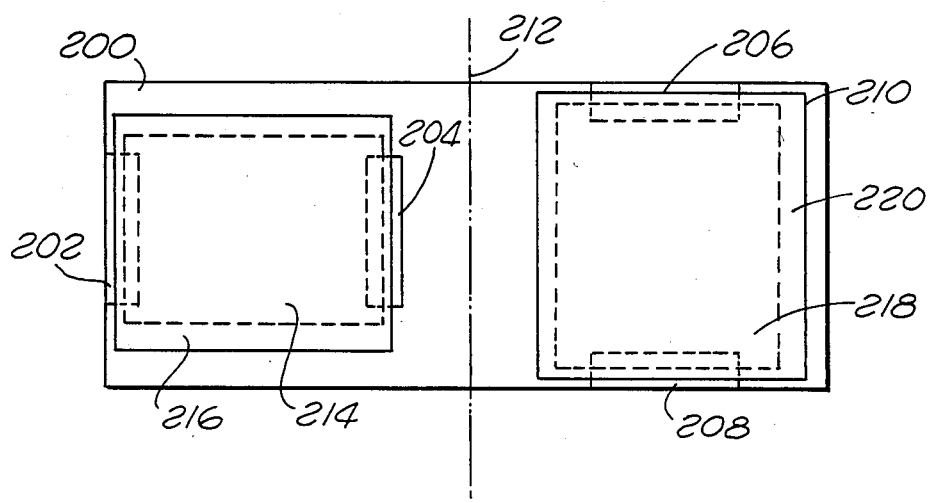
FIG. 10 is a folded digitizer pad in accordance with the invention wherein terminals and resistor plys are provided on both the base and the top plies.

Turning next to FIG. 10, another embodiment of the present invention is illustrated whereby one pair of terminals 202 and 204 are disposed in spaced relationship to one another on a base ply 200 and a second pair of terminals 206 and 208 are disposed in spaced relationship on a top ply 210. In one embodiment, the base ply 200 and the top ply 210 may be a single ply with a fold 212 in the center whereby the top and the base plies are folded into facing relationship to each other. Alternatively, the base ply 200 and the top ply 210 may be entirely separate.

Disposed between the terminals 202 and 204 is a resistor ply 214 on top of which is disposed a pressure sensitive ply 216 such as the particulated molybdenum disulphide material described in U.S. Pat. No. 4,315,238. Similarly, the top ply 210 has disposed thereon, between the terminals 206 and 208, a resistor ply 218 on top of which may be disposed a pressure sensitive semiconductor ply 220. In accordance with the invention, when the top ply 210 and the base ply 200 are positioned and aligned in proper facing alignment, the terminals 206 and 208 will not come in contact with the terminals 202 and 204.

Figure 11A:
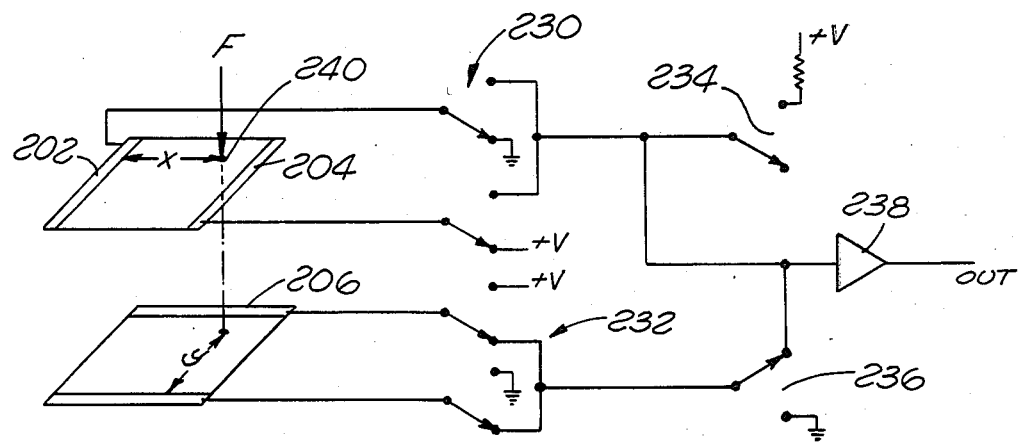
FIGS. 11A, 11B and 11C illustrate the operation of the digitizer pad embodiment illustrated in FIG. 10.
Figure 11B:
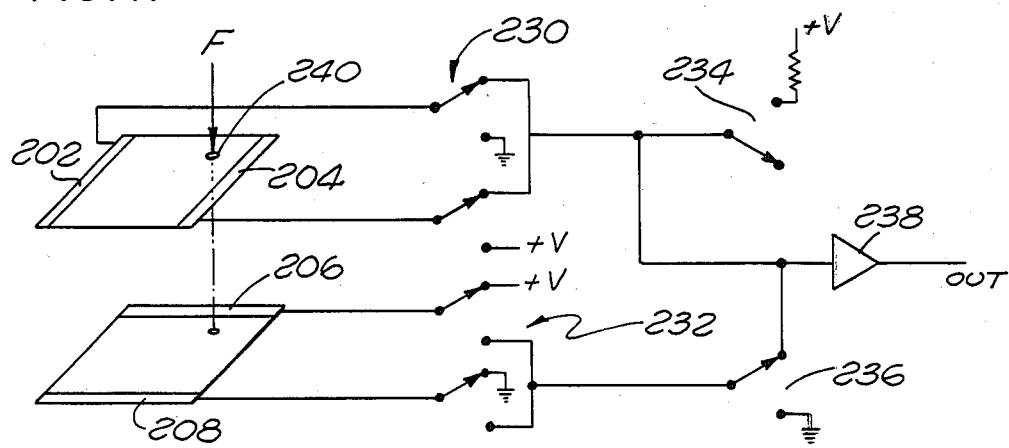
Figure 11C:
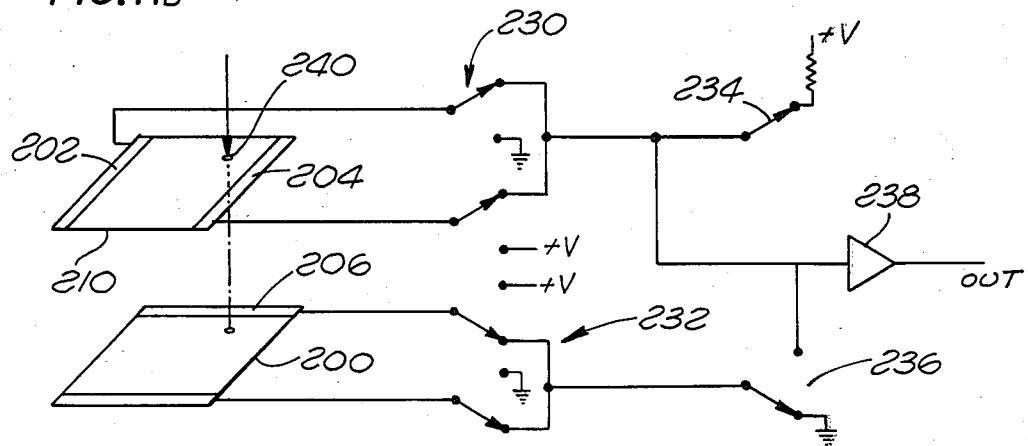

The operation of the embodiment of FIG. 10 is illustrated in FIGS. 11A, 11B and 11C. Referring specifically to the FIG. 11A, to measure the X-coordinate at point 240, the terminal 202 is connected to ground via switch 230 and the terminal 204 is connected to the voltage source +V via switch 230 to provide a voltage drop across the resistor ply between terminals 202 and 204. Simultaneously, terminals 206 and 208 are each coupled via switch 232 and 236 to the input of an amplifier 238. Thus, the voltage at the point of contact between the base ply 200 and the top ply 210 will be applied to the input of the amplifier 238 and hence the output of the amplifier 238.

Similarly, as shown in FIG. 11B, to obtain the Y-coordinate of the location 240 of force application, the terminal 202 and 204 are connected via switch 230 to the input of the amplifier 238 while the terminal 206 is connected to the voltage source +V and the terminal 208 is connected to ground via switch 232. Thus, the Y-coordinate voltage at point 240, which is the point on the surface of the digitizer pad at which the force F is applied, will appear at the output of the amplifier 238.

Finally, referring to FIG. 11C, in the embodiment where a pressure sensitive ply is positioned between the base ply 200 and the top ply 210, the measure of pressure may be obtained by connecting terminals 202 and 204 to voltage source +V via appropriate switching of switches 230 and 234 while simultaneously connecting the terminals 206 and 208 to ground via appropriate switching of switches 232 and 236. The voltage drop between the top ply 210 and the bottom ply 200 will then be the voltage drop across the junction between the base ply 200 and the top ply 210 with the resistance varying, and hence the potential drop across the junction varying, as the pressure varies.

Referring to FIGS. 12A and 12B, another digitizer pad 30 is illustrated including a base ply 302 on which is disposed three terminals 304, 306 and 308 in spaced apart, preferably parallel, relationship. Disposed across a surface 310 of the base ply 302 on which the terminals 304, 306 and 308 are affixed is a resistor ply 312. The resistor ply 312 may be of any configuration and may have any desired resistive gradient profile. In any event, the resistor ply 312 is applied to cover each of the terminals 304, 306 and 308 so as to be in electrical conducting relationship with those terminals. Digitizer pad 300 also includes a top ply 314 which, like the base ply 302 includes three terminals 316, 318 and 320 which are in parallel orientation relative to one another and are spaced apart from one another. In the preferred embodiment, insulator pads 322 are positioned at selected locations along each of the terminals 316, 318 and 320. The insulator pads 322 are positioned so that when the top ply 314 is folded over onto the base ply 302, the pads 322 will be between the crossover points between the terminals 316, 318 and 320 and the terminals 304, 306 and 308. In the preferred embodiment, the terminals 304, 306 and 308 are orthogonally oriented with respect to the terminals on the top ply at the terminals 316, 318 and 320 on the top ply 314.

In accordance with the preferred embodiment of the invention, a pressure sensitive semiconductive ply 324 is disposed over the surface of the top ply 314 covering the terminals 316, 318 and 320 so that the semiconductor ply 324 will be located immediately adjacent to but in normally nonconducting relationship to the resistor ply 312. In accordance with the invention, a switching network 326 has leads X1, X2 and X3 which are coupled respectively to terminals 304, 306 and 308 and leads Y1, Y2 and Y3, respectively coupled to leads 316, 318 and 320.

When the top ply 314 is folded over the base ply 302 so that the terminals 316, 318 and 320 are orthogonal to, and overlay, the terminals 304, 306 and 308 as illustrated by the dash lines in FIG. 12A, the region bounded by the terminals 316, 308, 320 and 304 will be divided by terminals 318 and 306 into quadrants. The switching network 326 provides a means of applying the voltage from voltage source 328 across a selected two terminals from the set of three terminals on the base ply 302 or a select pair of terminals from the set of three terminals on the top ply 314. For example, if it is desired to determine the location of the application of a force F in quadrant I, in the X direction, then the voltage from voltage source 328 may be applied to the terminal 306 through lead X2 with terminal 304 coupled to ground. Similarly, leads 316 and 318 will be coupled by the switching network 326 to the output. In a manner similar to that described in conjunction with FIGS. 11A, 11B and 11C, the output voltage will be a measure of the X dimension spacial coordinate in quadrant I. In a similar manner, the Y-coordinate in quadrant I can likewise be determined.

The switching network 326 can be configured to sequentially monitor quadrants I, II, III and IV in the X, Y and pressure (Z) coordinates to identify any point of force application. Once a particular point of force application is identified, the switching network 326 can eliminate scanning of all four quadrants and can remain in the quadrant of force application, continually sequencing through and determining the X, Y and pressure (Z) coordinates. By recording the parameters in the coordinates for a period of time, a profile of a change in the location of the application of force can be stored for later use in verifying future profiles.

Referring to FIG. 13, an embodiment of a digitizer pad 400 is illustrated having a configuration somewhat similar to that disclosed in FIGS. 12A and 12B. However, rather than having single terminals such as terminals 304, 306 and 308, each terminal consists of a pair of leads. Hence, terminal 404 (corresponding to terminal 304) consists of a pair of leads W7 and W8. Similarly, terminal 406 consists of a pair of leads W9 and W10. When a voltage is to be applied in the X direction in quadrant I, a voltage from a voltage source 428 is applied via switching network 426 to lead W9 with lead W8 coupled to ground. To provide isolation from spurious voltages that could reside on other leads, leads W7 and W10 are also coupled to ground. Similarly, leads W1 and W4 will be coupled to ground when a voltage is applied across leads W2 and W3. When, for example, the point of force application is in quadrant IV, then leads W9 and W12, W6 and W4 will be coupled to ground while leads W10 and W11 and leads W4 and W5 are alternately coupled across the voltage source 428 and ground to sequentially determine a voltage constituting a measure of the X and Y coordinates of the point of force application in quadrant IV. The coupling of the leads W9, W12 W6 and W3 to ground surrounds the fourth quadrant with grounded leads thereby isolating quadrant IV.

The particular mechanism for switching voltages between the various terminals is conventional and need not be discussed in detail.

Although switching networks have been discussed in connection with application of voltages across regions of the digitizer pad, it will be appreciated that electronic pulses of predefined voltages can be utilized under computer control to sequence through the steps illustrated in FIGS. 11A, 11B and 11C.

It will also be appreciated that various other electrical profiles may be created across the surface of a digitizer pad in accordance with the invention. Such changes in the potential profile may be effected, for example, by positioning of terminals, the shape of the terminals, the application of varying voltages to the different terminals, or the variation of resistive gradients along the resistor ply.

In addition, while the above description has been made with reference to the application of D.C. voltages, AC voltages, either in-phase or out-of-phase, may be applied to the various terminals in accordance with the invention.

What is claimed is:

1. A digitizer pad apparatus comprising:
    at least two sets of terminals, each set defining a parameter dimension;
    a resistor ply disposed between the terminals of each set and having an electrical contact surface, the resister ply having a resistance profile along the dimension between the terminals in each set;
    an output terminal;
    a first pressure sensitive ply disposed for overlaying the resistor ply between the resistor ply and the output terminal;
    means for electrical interconnecting the output terminal to a selected location along the contact surface of the resistor ply;
    a voltage source; and
    switching means for sequentially coupling the voltage source across selected terminals from the sets of terminals to provide a voltage drop across the selected terminals whereby the voltage at the output terminal is a measure of the selected location along the parameter dimension defined by the terminals across which the voltage source is coupled;
    the switching means further interconnected for selectively coupling the voltage source across the first pressure sensitive ply, whereby the voltage at the output terminal is a measure of the magnitude of the force pressing the first pressure sensitive layer against the resistor ply when the voltage source is coupled across the first pressure sensitive layer.

2. The digitizer pad of claim 1 further comprising:
a base ply;
the at least two sets of terminals being disposed on the base ply with the terminals in each set being spaced apart from one another and spaced apart from the terminals in each of the other sets of terminals; and
the means for electrically interconnecting comprising:
a top ply with an electrically conducting surface electrically connected to the output terminal and positioned opposite from the electrical contact surface of the resistor ply.

3. The digitizer pad of claim 2 wherein the first pressure sensitive layer is disposed to cover the electrically conducting surface of the top ply.

4. The digitizer pad of claim 2 wherein the first pressure sensitive layer is disposed to cover the contact surface of the resistor ply.

5. The digitizer pad of claim 3 further comprising a second pressure sensitive layer disposed for covering the contact surface of the resistor ply.

6. The digitizer pad of claim 1 wherein there are two sets of terminals, each set comprising a first terminal and a second terminal in parallel orientation to the first terminal, and wherein the parallel terminals in one set are spaced apart from and orthogonally oriented relative to the parallel terminals in the other set.

7. The digitizer pad of claim 1 wherein the resistor ply comprises a single resistance layer disposed in electrically contacting relationship to each of the terminals in each set and the contact surface comprises the surface of the resistance layer in the region between the terminals.

8. The digitizer pad of claim 1 wherein the resistance profile defines a linearly varying resistance along the spacial dimension between at least a select two terminals in at least one of the sets of terminals.

9. The digitizer pad of claim 1 wherein there are two sets of terminals and wherein the resistor ply comprises:
a first resistance layer electrically coupled to the terminals of one of the sets of terminals; and
a second resistance layer electrically coupled to the terminals of the another of the sets of terminals, the first and second resistance layers being positioned opposite one another in normally nonconducting relationship for being electrically coupleable upon depression of one resistance layer against the other at the selected location.

10. The digitizer pad apparatus of claim 1 further comprising:
a base ply having at least one of the sets of terminals disposed thereon;
a top ply having at least one other of the sets of terminals disposed thereon.

11. The digitizer pad apparatus of claim 10 further comprising:
a first pressure sensitive layer disposed on the base ply.

12. The digitizer pad apparatus of claim 11 comprising:
a second pressure sensitive layer disposed on the top ply.

13. A digitizer pad apparatus comprising:
a base ply;
at least two sets of terminals disposed on the base ply, each set of terminals positioned in spaced apart relationship;
a resistor ply disposed on the base ply in electrical contact with each of the terminals for providing an electrical conduction path between the terminals of each set of terminals, the resistor ply defining a resistance profile along the spacial dimension between selected pairs of terminals in each set of terminals;
a top ply;
a conductive ply disposed on the top ply and positioned in facing relationship to the resistor ply;
a voltage source;
switching means interconnected to the terminals and to the voltage source for intermittently selecting a pair of terminals and interconnecting the voltage source across the selected pair of terminals for providing a voltage drop between the selected pair of terminals, and simultaneously interconnecting the remaining terminals to provide a substantially zero voltage drop thereacross, the conductive ply being selectively moveable to make contact against the resistor ply at a selected location to enable conduction between the conductive ply and one of the terminals in the selected pair of terminals, the voltage at the selected location defining a parameter measure in the spacial dimension defined by the paid of terminals across which the voltage is coupled; and
a first pressure sensitive layer disposed between the conductive ply and the resistor ply, the switching means further interconnected for providing a zero voltage along the resistor ply but a voltage differential across the first pressure sensitive layer, the voltage differential varying inversely with the magnitude of force applied to press the first pressure sensitive layer against the resistor ply at the selected location.

14. The digitizer pad of claim 13 wherein at least one set of terminals comprises a pair of terminals where the individual terminals defining a first spacial dimension are in non-parallel orientation to each other.

15. The digitizer pad of claim 13 wherein the resistor ply has a predefined non-linear resistance characteristic between a selected pair of the terminals.

16. The digitizer pad of claim 13 wherein there are at least three pairs of terminals oriented in the same geometric plane wherein the terminals in each pair are positioned opposite each other in spaced apart relationship.

17. The digitizer pad of claim 13 wherein the terminals are disposed at predefined locations on the base ply for segmenting the digitizer pad into a plurality of regions, the digitizer pad further comprising means for sequentially scanning each region for the pressure of a contact point between the conductive ply and the resistor ply, each region being electrically isolateable from each other region.

18. The digitizer pad of claim 17 further comprising means for selecting the region having a contact point and terminating the scanning of the other regions upon sensing of a contact point in the region having the contact point.

19. The digitizer pad of claim 18 further comprising means for selecting the region having a contact point and terminating the scanning of the other regions upon sensing of a contact point in the region having the contact point.

20. A digitizer pad apparatus comprising:
a base ply;
at least one set of base ply terminals disposed on the base ply, the base ply terminals being in spaced apart relationship;
a base resistor ply disposed on the base ply in electrical contact with each of the base ply terminals for providing an electrical conduction path between selected pairs of base ply terminals;
a top ply positioned in facing relationship to the base ply;
at least one set of top ply terminals disposed on the top ply, the top ply terminals being in spaced apart relationship to each other;
a top resistor ply disposed on the top ply in electrical contact with each of the top ply terminals for providing an electrical conduction path between selected pairs of top ply terminals, the top resistor ply facing the base resistor ply;
a pressure sensitive layer disposed between the base resistor ply and the top resistor ply;
a voltage source; and
switching means interconnected to the base ply terminals, to the top ply terminal and to the voltage source for intermittently selecting one pair of terminals from one of the sets of top ply and bottom ply terminals and interconnecting the selected pair of terminals to the voltage source for providing a voltage drop between the selected pair, and interconnecting the remaining terminals to have a substantially zero voltage drop therebetween, and at least one of the base and top plies being selectively moveable to cause the top resistor ply and the base resistor ply to make electrical conducting contact at a selected location to enable conduction along a conduction path between one terminal from the selected pair and through the base and top resistor plies whereby the voltage drop along the conduction path defines a parameter measure of the selected location along a spacial dimension defined by the select pair of terminals across which the voltage source is coupled and further interconnected for intermittently coupling the voltage source to cause a zero voltage across the pairs of base and top ply terminals but coupling the voltage source across the pressure sensitive layer, the voltage across the pressure sensitive layer varying inversely with the magnitude of force applied to press the base resistor ply and the top resistor ply together with the pressure sensitive layer therebetween at the selected location.

21. The digitizer pad of claim 20 wherein at least one set of terminals, selected from the base ply terminals and the top ply terminals, comprises a pair of terminals where the individual terminals defining a first spacial dimension are in non-parallel orientation to each other.

22. The digitizer pad of claim 20 wherein at least one of the base resistor ply and top resistor ply has a predefined nonlinear resistance characteristic between a selected pair of the base ply terminals and top ply terminals, respectively.

23. The digitizer pad of claim 20 wherein there are at least three pairs of base ply, top ply or both base ply and top ply terminals oriented in the same geometric plane wherein the terminals in each pair are positioned opposite each other in spaced apart relationship.

24. The digitizer pad of claim 20 wherein the top ply terminals and the base ply terminals are disposed at predefined locations on the top ply and base ply respectively for segmenting the digitizer pad into a plurality of regions, the digitizer pad further comprising means for sequentially scanning each region for the pressure of a contact point between the conductive ply and the resistor ply, each region being electrically isolateable from each other region.

* * * * *